(No Model.)
J. C. PALMER.
HIGH AND LOW WATER INDICATOR.
No. 327,304. Patented Sept. 29, 1885.
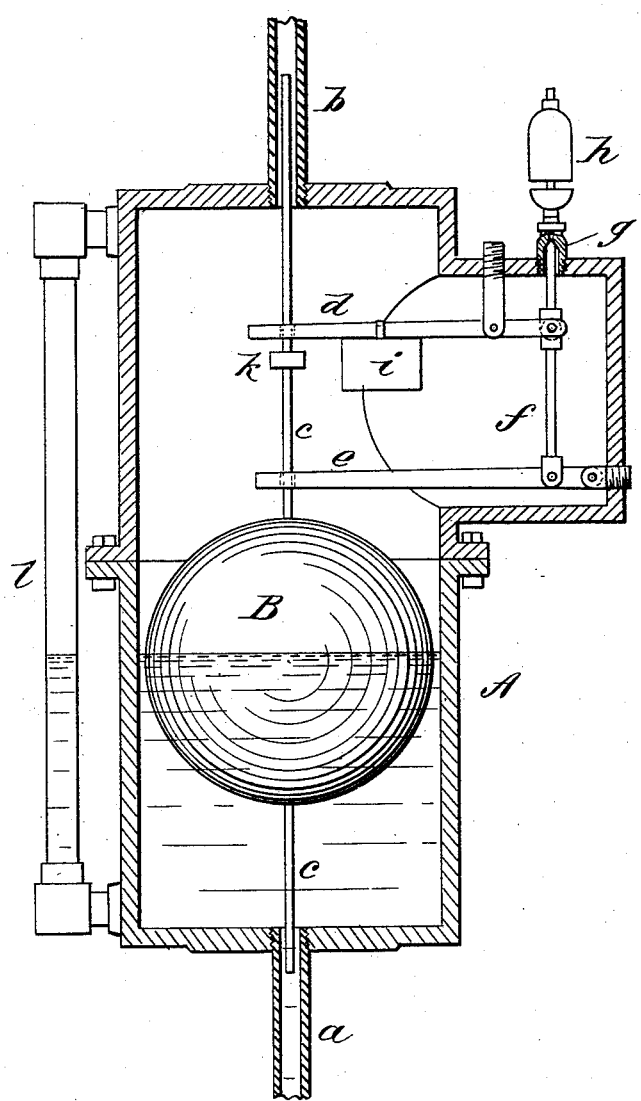
WITNESSES:
Donn Twitchell
C. Sedgwick
INVENTOR:
J. C. Palmer
BY Munn & Co.
ATTORNEYS.

United States Patent Office.

JOHN C. PALMER, OF HAMILTON, ONTARIO, CANADA.

HIGH AND LOW WATER INDICATOR.

SPECIFICATION forming part of Letters Patent No. 327,304, dated September 29, 1885.

Application filed November 28, 1884. (No model.)

*To all whom it may concern:*

Be it known that I, JOHN C. PALMER, residing in Hamilton, in the Province of Ontario and Dominion of Canada, have invented a new and useful Improvement in High and Low Water Indicators and Alarms for Boilers, of which the following is a full, clear, and exact description.

The object of my invention is to provide a device for indicating the height of water in steam-boilers and for giving an alarm when the water rises too high or falls below the safety-point; and it consists in the construction and arrangement of parts, as will be hereinafter fully described and claimed.

Reference is to be had to the accompanying drawing, forming a part of this specification, in which the apparatus is shown by a sectional elevation.

The vessel or receptacle A, of suitable size, is to be supported near the boiler at about the water-level, and is connected by pipe $a$ to the water-space, and pipe $b$ to the steam-space, of the boiler.

In the vessel A is a float, B, upon a rod, $c$, that is sustained in a vertical position by suitable guides, the rod also passing through the outer ends of two levers, $d$ $e$, which are hung on the side of the vessel so as to project horizontally. The levers $d$ $e$ are jointed to a valve-rod, $f$, the upper end of which enters a seat, $g$, beneath an aperture leading to a whistle, $h$, that is attached to seat $g$, and a weight, $i$, on one lever tends to raise the valve-rod and thus close the aperture.

On rod $c$, between the two levers $d$ $e$, is a collar, $k$, which is brought in contact with one lever or the other by the rise and fall of the float.

The levers being so arranged that the distance between them represents the variation between high and low water in the boiler, when the water rises to the highest point, the float rising with it, the lever $d$ will be moved by collar $k$, the rod $f$ thus moved down, and the whistle will be sounded. A similar result takes place when by fall of the water the lever $e$ is moved by contact of the collar.

At $l$ is a glass gage-tube attached to vessel A, for showing the height of water; and gage-cocks may also be provided.

Having thus fully described my invention, I claim as new and desire to secure by Letters Patent—

A high and low water indicator consisting, essentially, in the vessel A, having boiler-connections $a$ $b$, the float B, the guide-rod $c$, having a collar, $k$, the lower horizontal lever, $e$, pivoted at one end to the interior of the vessel and extended to the guide-rod $c$ below the collar $k$, the upper lever, $d$, pivoted between its ends to the casing to form a long and a short arm, of which the long arm extends to the guide-rod above the collar $k$, an alarm, as at $h$, and the valve-rod $f$, pivoted to the lever $e$ between its ends, and pivoted to the short arm of the lever $d$, substantially as set forth.

JOHN C. PALMER.

Witnesses:
C. A. WYLLIE, Jr.,
A. VINCENT.